United States Patent

Washizawa

[15] 3,638,744
[45] Feb. 1, 1972

[54] VEHICLE SPEED-CHANGE AND STEERING APPARATUS

[72] Inventor: Yoshikazu Washizawa, Fujimi-machi, Iruma-gun, Japan
[73] Assignee: Honda Giken Kogyo Kabushiki Kaisha, Tokyo, Japan
[22] Filed: Apr. 16, 1970
[21] Appl. No.: 29,020

[30] Foreign Application Priority Data

Apr. 18, 1969 Japan..................................44/29636

[52] U.S. Cl..........................................180/6.2, 74/230.17 E
[51] Int. Cl.................................................B62d 11/10
[58] Field of Search.........180/6.2, 6.7, 76; 74/722, 230.17 E

[56] References Cited

UNITED STATES PATENTS

| | | | |
|---|---|---|---|
| 2,882,753 | 4/1959 | Pakosh | 74/722 |
| 2,529,489 | 11/1950 | Curtis | 74/722 |
| 3,376,760 | 4/1968 | Gordanier | 74/722 X |
| 2,420,100 | 5/1947 | Salsbury | 74/230.17 E X |
| 2,395,625 | 2/1946 | Heyer | 74/230.17 E |
| 2,852,950 | 9/1958 | Uher | 74/230.17 E |

FOREIGN PATENTS OR APPLICATIONS

| | | | |
|---|---|---|---|
| 940,347 | 10/1963 | Great Britain | 180/6.2 |
| 6,538 | 12/1907 | Great Britain | 74/230.17 E |
| 798,357 | 7/1958 | Great Britain | 74/230.17 E |

*Primary Examiner*—Benjamin Hersh
*Assistant Examiner*—Leslie J. Paperner
*Attorney*—Waters, Roditi, Schwartz & Nissen

[57] ABSTRACT

A vehicle speed-change and steering apparatus comprises a pair of right and left stepless speed-change mechanisms each having a stationary pulley, a movable pulley and a belt interposed between the two pulleys, the pulleys being mounted on a driving shaft. A pair of rack rods are respectively connected to the right and left movable pulleys, and the rack rods are meshed with a single common pinion, such that the right and left movable pulleys are constrained to be moved in equal quantities in mutually opposite directions by the operation of a rotation detecting mechanism on the driving shaft and engaging the moving pulleys. Additionally, the right and left pulleys may be moved in the same directions by moving the pinion to the right or left to effect differential variation of speed of the belts of the speed-change mechanisms.

7 Claims, 3 Drawing Figures

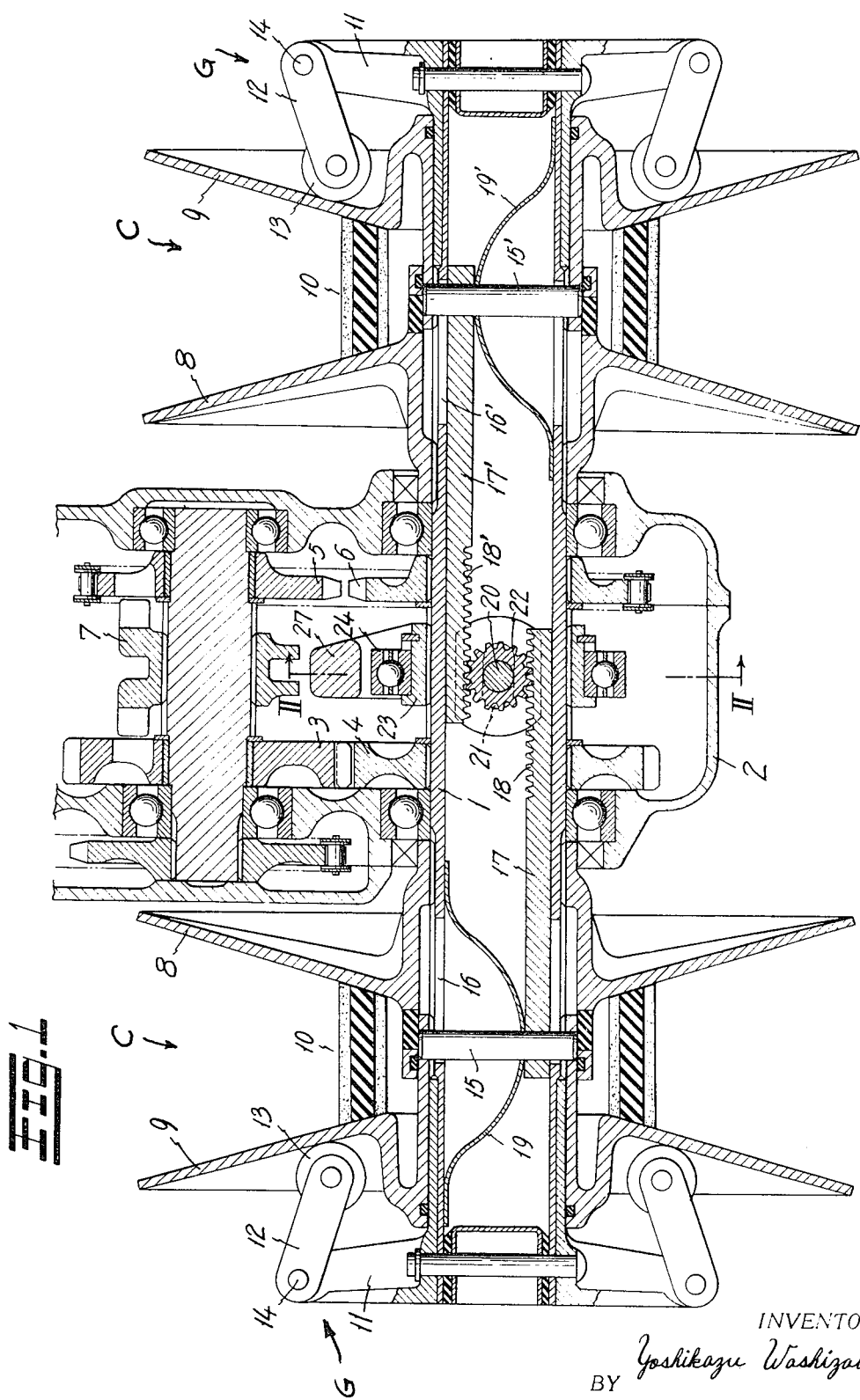

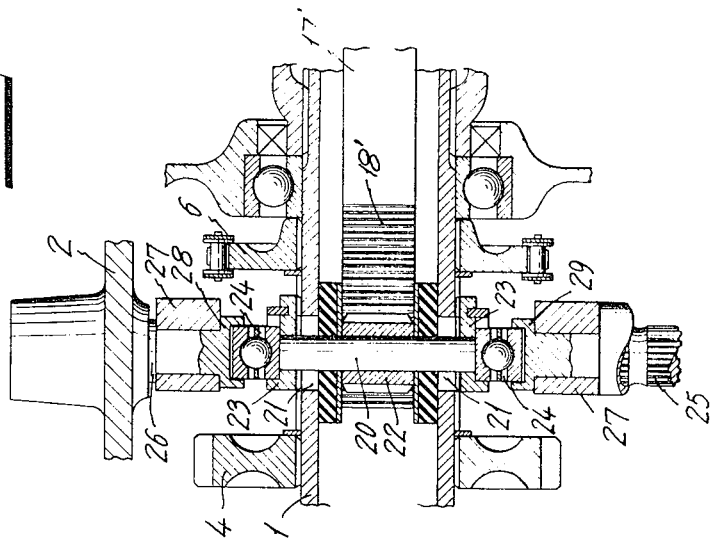
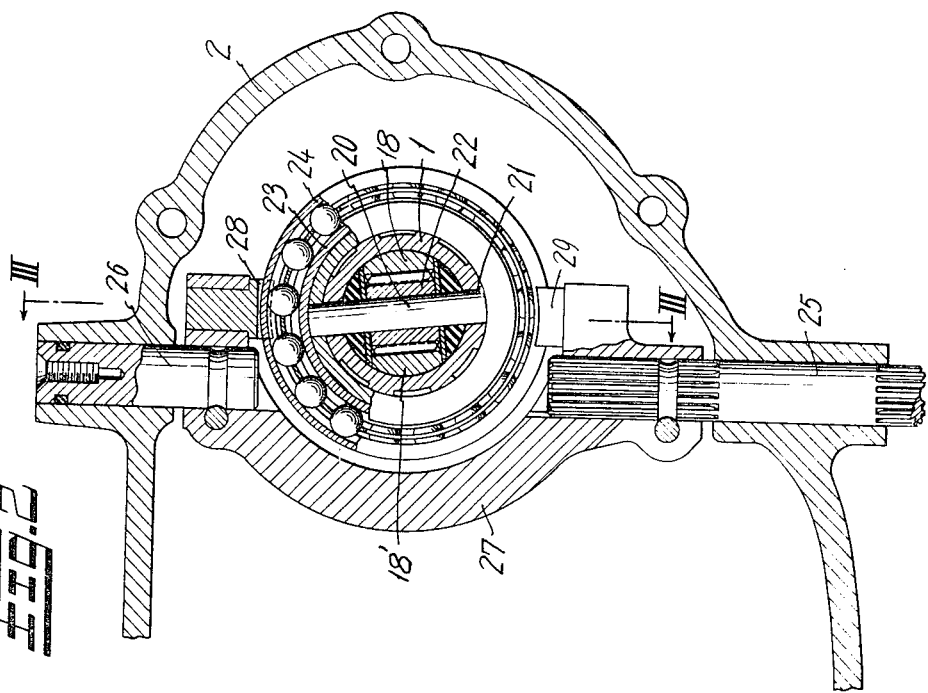

VEHICLE SPEED-CHANGE AND STEERING APPARATUS

BRIEF SUMMARY OF THE INVENTION

This invention relates to a speed-change and steering apparatus for a vehicle in which stepless speed-change and steering of the vehicle can be effected by a single mechanism.

It is usual in a conventional vehicle that a speed-change apparatus and a steering apparatus are separately provided independent of one another, and this invention seeks to provide a speed-change and steering apparatus such that a mechanism used for both speed-change and steering is provided on a single driving shaft for making the construction thereof a simple and compact, improving the straightway running feature of the vehicle, and increasing the power transmission efficiency.

In accordance with the invention there is provided a vehicle speed-change and steering apparatus comprising first and second means for driving right and left vehicle ground support means for propulsion of the vehicle, said first and second means including respective speed-change means for varying the speed at which the associated ground support means is driven, speed control means for adjusting the speed-change means of the first and second means to vary vehicle speed, coupling means operatively coupling the respective speed-change means of the first and second means and the speed control means to constrain the speed-change means to undergo conjoint operation thereof upon desired change of vehicle speed to cause the right and left ground support means to be varied equally, and steering means operatively coupled to both said speed-change means via said coupling means to vary the speed-change means differentially and thereby vary the speed of the left and right vehicle ground support means to produce turning of the vehicle.

Said first and second speed-change means each comprises a stationary pulley, a movable pulley and a belt interposed between the pulleys for driving the associated ground support means. Said coupling means comprises a rack rod connected to each movable pulley and a common pinion in mesh with each rack rod.

In further accordance with the invention, said speed control means comprises a rotatable shaft supporting said pulleys and coupled therewith for common rotation, the movable pulleys of the speed-change means being slidably mounted on the shaft, and speed detection means on said shaft and coupled to a respective movable pulley to move the same on the shaft relative to the associated stationary pulley in response to variation of rotational speed of the shaft, said common pinion constraining the racks to move equally thereby causing the movable pulleys to move equally. The rack rods extend in facing relation in mesh with said common pinion and the movable pulleys of the speed-change means move in mutually opposite directions during speed-change. The steering means comprises means for displacing said common pinion to move said rack rods in the same direction.

BRIEF DESCRIPTION OF THE DRAWING

FIG. 1 is a longitudinal sectional view of one embodiment of a vehicle speed-change and steering apparatus according to the invention.

FIG. 2 is a sectional view taken along the line II—II in FIG. 1, and

FIG. 3 is a sectional view taken along line III—III in FIG. 2.

DETAILED DESCRIPTION

Numeral 1 denotes a driving shaft rotatably supported by a transmission casing 2, and there are fixedly mounted on shaft 1 a driving gear 4 and a driving chain sprocket 6 engaged respectively with input gear 3 and input chain sprocket 5 which are driven by a prime mover (not shown), so that the driving shaft 1 may be rotated in either regular or reverse direction by driving either the gear 3 or the chain sprocket 5 by the operation of a clutch 7.

On both sides of the transmission casing 2, there is mounted on shaft 1 a pair of continuous speed-change mechanisms C. The mechanisms C are entirely equal in construction one to the other, and therefore only one of them will be explained in detail as follows. Namely, a stationary pulley 8 and a movable pulley 9 facing the pulley 8 are provided on the driving shaft 1, and the movable pulley 9 is arranged to be movable right and left along the driving shaft 1 by means of a spline engagement or the like. A transmission belt 10 for actuating a ground support means for vehicle propulsion such as a road-wheel or an endless track is interposed between the facing inclined inner surfaces of these pulleys 8 and 9 for being held therebetween.

On the outer side of each movable pulley 9, there is provided on the driving shaft 1 a rotation detecting mechanism G for the driving shaft 1. This mechanism G comprises radial supporting arms 11, on the driving shaft 1, swingable arms 12, pivotally attached at 14, to respective top ends of supporting arms 11, and weights 13 rotatably supported on respective end of the swingable arms 12, the weights 13 being arranged to come into contact with the outer surface of a respective movable pulley 9. Accordingly, the swingable arms 12 are moved outwardly and inwardly depending on the speed of rotation of the driving shaft 1 for causing through the weights 13 and thereby the movable pulley 9 to slide axially right and left along on the driving shaft 1.

At the left and right portions of the driving shaft 1, there are axially extending slits 16 and 16', and connecting pins 15 and 15' are slidably mounted on these slits 16 and 16', each of these pins 15 and 15' being connected at its opposite ends to the boss portion of the corresponding movable pulley 9.

Respective rack rods 17 and 17' are connected at their base ends to the connecting pins 15 and 15' and respective toothed portions 18 and 18' of these rack rods 17 and 17' face one another at the middle portion of the driving shaft 1 and are in mesh with a pinion 22 to be described more fully hereinafter. The rack rods 17 and 17' are urged into pressure contact with the inner surface of the driving shaft 1 by means of respective pressure springs 19 and 19' provided within the driving shaft 1.

At the middle of the driving shaft 1, there are provided slits 21 facing one another, and a pinion shaft 20 carrying the pinion 22 is slidably mounted at both ends thereof in the slits 21, so that the pinion 22 is meshed with the toothed portions 18 and 18' of the rack rods 17 and 17' inside the driving shaft 1. The end of the pinion shaft 20 projecting outside the driving shaft 1 is in engagement with a bearing holder 23 holding a bearing 24, such that the bearing holder 23 is permitted to move along the driving shaft axially along with the pinion shaft 20.

An operation shaft 25 arranged to move with a steering shaft of the vehicle and a supporting shaft 26 are supported by the transmission casing 2 in such a manner that they are substantially in alignment one with another, and a C-shaped rotating member 27 extending along the circumference of the bearing 24 is bridged between the shaft 25 and 26, so that by the rotation of a steering wheel, the operation shaft 25, the rotating member 27 and the supporting shaft 26 can be rotted together. A pair of engaging pins 28 and 29 are supported on both ends of the rotating member 27, and these pins 28 and 29 are engaged with the outer surface of the bearing 24.

If it is now assumed that, under the condition of FIG. 1, the driving shaft 1 is rotated at a predetermined speed, this rotating force is transmitted to the right and left road-wheels or tracks to drive them at a predetermined speed, through the stationary and movable pulleys 8, 9 and the belt 10 on each side.

If the driving shaft 1 is increased in speed, the swingable arms 12, having the weights 13, are moved outwards by the action of a centrifugal force, so that the right and left movable pulleys 9 are pushed by the weights 13 inwards, whereby the belt 10 on each side is moved outwards between the stationary and movable pulleys 8 and 9. In accordance with the sliding movements of the right and left movable pulleys 9, the rack rods 17 and 17' connected to the connecting pins 15 and 15' are both slidably moved inwards, but in this case since the rack rods 17 and 17' are in engagement with the single common pinion 22, the amount of slide movement of the two are regulated to be equal one to the other. Accordingly, even if there should be more or less of a difference in operation between the right and left detecting mechanisms G, the right and left movable pulleys 9 are moved in equal amounts, so that the right and left road-wheels or tracks are driven at equal increased speeds.

If the driving shaft is decreased in speed, the right and left movable pulleys 9 are both slidably moved outwards in equal amounts so that the right and left road-wheels or tracks can be driven at equal decreased speeds.

Accordingly, the vehicle can be driven at various speeds without losing the straightaway running feature of the same.

There will now be explained the condition in which the right and left belts 10 are differently operated to effect vehicle steering. If the operation shaft 25 is now rotated by the rotation of the steering wheel, the rotating member 27 is also rotated and the pair of engaging pins 28 and 29 force the bearing 24 and the bearing holder 23 to slide along the driving shaft 1, whereby the pinion shaft 20 in engagement with the bearing holder 23 can be moved along the slits 21 made in the driving shaft 1.

Due to the fact that the pinion 22 mounted on the pinion shaft 20 is in engagement with the toothed portions 18 and 18' of the rack rods 17 and 17', this movement of the pinion shaft 20 causes the rack rods 17 and 17' to move in the same direction. Accordingly, the space between the stationary and movable pulleys 8 and 9 on the right side and that on the left side are differentially changed so that the right and left belts 10 are differentially operated to vary the drive speeds of the right and left road-wheels or tracks to turn the vehicle.

In the illustrated embodiment, the right and left speed-change mechanisms C have respective rotation detecting mechanisms G, but it may be enough that only either one of these speed-change mechanisms C has the rotation detecting mechanism G.

As will be clear from the above embodiment, this invention is such that speed-change and steering can be performed by a single common mechanism. At the time of speed-change operation, the distance between the stationary and movable pulleys on the right and that on the left can be always kept equal and there can never be caused any difference in speed between the right and left belts, so that the straightway running feature of the vehicle can be improved and the power transmission efficiency can be increased. At the time of the steering operation, simply by moving the pinion of the speed-change mechanism to the right or the left, the right and left belts can be differentially operated so that the steering operation can be achieved extremely accurately.

What is claimed is:

1. A vehicle speed-change and steering apparatus comprising first and second means for driving right and left vehicle ground support means for propulsion of the vehicle, said first and second means including respective speed-change means for varying the speed at which the associated ground support means is driven, said first and second speed-change means each comprising a stationary pulley, a movable pulley and a belt interposed between the stationary pulley and the movable pulley for driving the associated ground support means, speed control means for adjusting the speed change means of the first and second means to vary vehicle speed, coupling means operatively coupling the respective speed-change means of the first and second means and the speed control means to constrain the speed change means to undergo conjoint operation thereof upon desired change of vehicle speed to cause the right and left ground support means to be varied equally, said coupling means comprising a rack rod connected to each movable pulley and a common pinion in mesh with each rack rod to cause each rack rod to move equally in opposite direction during speed change, and steering means operatively coupled to both said speed-change means via said coupling means to vary the speed-change means differentially and thereby vary the speed of the left and right vehicle ground support means to produce turning of the vehicle, said steering means including means for displacing said common pinion to move said rack rods in the same direction.

2. Apparatus as claimed in claim 1 wherein said means for displacing said common pinion comprises a slidable member supporting said pinion, and a rotatable control element coupled to said slidable member for displacing the same.

3. Apparatus as claimed in claim 1 wherein said speed control means comprises a rotatable shaft supporting said pulleys and coupled therewith for common rotation, the movable pulleys of the speed-change means being slidably mounted on the shaft, and speed detection means on said shaft and coupled to a respective movable pulley to move the same on the shaft relative to the associated stationary pulley in response to variation of rotational speed of the shaft.

4. Apparatus as claimed in claim 3 wherein the rack rods extend in facing relation in mesh with said common pinion and the movable pulleys of the speed-change means move in mutually opposite directions during speed change.

5. Apparatus as claimed in claim 3 wherein speed detection means comprises centrifugally operated weights on said shaft engaging the movable pulleys along radially inclined surfaces thereof.

6. Apparatus as claimed in claim 5 wherein said shaft is hollow and said rack rods are supported in said shaft, said shaft being provided with slots, each movable pulley including a connecting pin joined to the associated rack rod and engaged in a respective slot.

7. Apparatus as claimed in claim 6, wherein said shaft is provided with slits and said pinion is supported within said shaft and includes a supporting pinion shaft extending through said slits and engaging the steering means.

* * * * *